US006706311B2

(12) United States Patent
Wong et al.

(10) Patent No.: US 6,706,311 B2
(45) Date of Patent: Mar. 16, 2004

(54) LOW FAT NUT SPREAD COMPOSITION WITH HIGH PROTEIN AND FIBER

(75) Inventors: Vincent York-Leung Wong, Hamilton, OH (US); Susana R. Waimin Siu, Cincinnati, OH (US); Richard Joseph Sackenheim, Hamilton, OH (US)

(73) Assignee: The Procter & Gamble Co., Cincinnati, OH (US)

( * ) Notice: Subject to any disclaimer, the term of this patent is extended or adjusted under 35 U.S.C. 154(b) by 204 days.

(21) Appl. No.: 09/813,251

(22) Filed: Mar. 20, 2001

(65) Prior Publication Data

US 2002/0037355 A1 Mar. 28, 2002

Related U.S. Application Data

(60) Provisional application No. 60/192,813, filed on Mar. 29, 2000.

(51) Int. Cl.$^7$ .................................................. A23L 1/38
(52) U.S. Cl. ........................ 426/633; 426/518; 426/548; 426/615
(58) Field of Search ............................... 426/633, 615, 426/518, 548

(56) References Cited

U.S. PATENT DOCUMENTS

| | | | |
|---|---|---|---|
| 1,395,934 A | 11/1921 | Stockton | |
| 2,504,620 A | 4/1950 | Avera | |
| 2,521,243 A | 9/1950 | Mitchell, Jr. | |
| 2,552,925 A | 5/1951 | Avera | |
| 2,562,630 A | 7/1951 | Mitchell, Jr. | |
| 2,688,554 A | 9/1954 | Avera | |
| 3,129,102 A | 4/1964 | Sanders | |
| 3,265,507 A | 8/1966 | Japikse | |
| 3,903,308 A | 9/1975 | Ode | |
| 3,976,806 A | 8/1976 | Ziccarelli | |
| 4,017,645 A | 4/1977 | Ziccarelli | |
| 4,038,423 A | 7/1977 | Hayward et al. | |
| 4,042,721 A | 8/1977 | Ziccarelli | |
| 4,055,669 A | 10/1977 | Kelly et al. | |
| 4,151,308 A | 4/1979 | Ziccarelli et al. | |
| 4,152,462 A | 5/1979 | Hayward et al. | |
| 4,341,814 A | 7/1982 | McCoy | |
| 4,451,488 A | 5/1984 | Cook et al. | |
| 4,543,262 A | 9/1985 | Michnowski | |
| 4,568,557 A | 2/1986 | Becker et al. | |
| 4,832,971 A | 5/1989 | Michnowski | |
| 4,996,074 A | 2/1991 | Seiden et al. | |
| 5,079,027 A | 1/1992 | Wong et al. | |
| 5,164,217 A | 11/1992 | Wong et al. | |
| 5,230,919 A | 7/1993 | Walling et al. | |
| 5,433,970 A | 7/1995 | Wong et al. | |
| 5,490,999 A | 2/1996 | Villagran et al. | |
| 5,508,057 A | 4/1996 | Wong et al. | |
| 5,518,755 A | 5/1996 | Wong et al. | |
| H1636 H | 3/1997 | Sevenants et al. | |
| 5,667,838 A | 9/1997 | Wong et al. | |
| 5,693,357 A | 12/1997 | Wong et al. | |
| 5,714,193 A | 2/1998 | Fix et al. | |
| 5,885,645 A | 3/1999 | Wong et al. | |
| 5,885,646 A | 3/1999 | Wong et al. | |
| 5,942,275 A | 8/1999 | Wong et al. | |
| 6,010,737 A | 1/2000 | Meade | |
| 6,039,999 A | 3/2000 | Bakshi et al. | |
| 6,063,430 A | 5/2000 | Wong | |
| 6,136,366 A | 10/2000 | Liedl, Jr. et al. | |
| 6,312,754 B1 | 11/2001 | Wong et al. | |

FOREIGN PATENT DOCUMENTS

| | | |
|---|---|---|
| GB | 2007961 A | 5/1979 |
| WO | WO 98/58552 | 12/1998 |
| WO | WO 00/51449 | 9/2000 |

OTHER PUBLICATIONS

JIF Recipes, "JIF Peanut Butter Recipes for Any Time of the Day"—Product Insert—1998 Proctor & Gamble Co.
Internet Article—"Re: Reese's Peanut Butter"—Recipe Exchange, extracted Mar. 27, 2000.
Internet Article—"Peanut Butter Cups"—Desserts, Fabulous Foods, extracted Mar. 27, 2000.
Internet Article—Reese's Peanut Butter Cups—Exported from MasterCook Mac—Feb. 19, 1996, extracted Mar. 27, 2000.
Internet Article—"Peanut Butter Bites with Chocolate"—Dan's Favorite Recipes, Copyright 1997, extracted Mar. 27, 2000.
Internet Article—"Peanut Butter Cups"—extracted Mar. 27, 2000.
Internet Article—"Buckeye's"—Smucker's Recipes, extracted Mar. 27, 2000.
Internet Article—"Hershey's Buckeye's"—www.Hershey.com—Chocolate & More, extracted Mar. 27, 2000.
Internet Article—"Peanut Butter Bars"—extracted Mar. 27, 2000.
Internet Article—"Top Secret Recipes Version of Kellogg's Peanut Butter Chocolate Rice Krispies Treats", extracted Mar. 27, 2000.
Internet Article—"Peanut Butter Crispy Treats"—M&Ms Recipe Archive, extracted Mar. 27, 2000.
Internet Article—"Marshmallow Peanut Butter Squares"—Aunt Libby's Kitchen, www. mcgees.com/kitchen/, extracted Mar. 27, 2000.
Internet Article—"Corn Flake Peanut Butter Squares", extracted Mar. 27, 2000.
Internet Article—"Peanut Butter Chocolate Rice Krispie Treats"—Pastry Wiz Recipe Archive, extracted Mar. 27, 2000.
Internet Article—"Take a Tax Break—Peanut Butter Crispies", USA Rice Federation, Copyright 1997–98, extracted Mar. 27, 2000.

Primary Examiner—Helen Pratt
(74) Attorney, Agent, or Firm—Melody A. Jones

(57) ABSTRACT

A low fat nut spread having high protein and high fiber. The nut spread has a protein to fat ratio of greater than about 0.68:1 and a fiber to fat ratio of greater than about 0.18:1. The nut spread has good flavor and texture. The process for making the nut spread is also disclosed.

7 Claims, No Drawings

LOW FAT NUT SPREAD COMPOSITION WITH HIGH PROTEIN AND FIBER

CROSS-REFERENCE TO RELATED APPLICATIONS

This application claims the benefit of priority to U.S. Provisional Application Ser. No. 60/192,813, filed Mar. 29, 2000, which is herein incorporated by reference.

TECHNICAL FIELD

The invention relates to low fat nut spreads, especially peanut spreads, having a high protein and high fiber content. More particularly, it relates to the use of oil substitutes to achieve fat reduction in the nut spreads, while maintaining the flavor and texture of full fat nut spreads.

BACKGROUND OF THE INVENTION

Conventional peanut and other nut butters or spreads comprise a mixture of solid nut particles, oil, flavorants (e.g., a sweetener such as sugar, high fructose corn syrup or honey, and salt), and stabilizer. Peanut butters typically comprise about 50% oil and about 50% solids. Peanut butter is a nutritious food that typically has a protein to fat ratio of about 0.5:1 and a fiber to fat ratio of about 0.1:1. Peanut butters comprising these levels of solids and oil have good texture, spreadability and flavor.

For some applications, however, it is desirable to have a peanut spread that comprises higher levels of solids. This may be the case, for example, when a high protein, high fiber and/or reduced fat nut spread is desired. Such nut spreads are desirable, for instance, for use as fillings in making nutritious snacks.

Nut spreads with high protein, high fiber and/or reduced fat are typically prepared by increasing the level of solid ingredients present in the final product relative to the level of oil. The ratio of solids to oil is greater than 1 in these products. Reduced fat peanut spreads, for example, typically comprise from about 58% to about 75% solids and from about 25% to about 42% oil, with a ratio of solids to oil of about 67/33, or about 2:1. Reduced fat peanut spreads typically have protein/fat and fiber/fat ratios of about 0.67:1 and about 0.17:1, respectively.

Unfortunately, increasing the level of solids in the nut spread relative to the level of oil can have deleterious effects on the quality of the nut spread. For example, increasing the level of solids in a nut spread can increase the viscosity of the spread such that the spread is undesirably stiff (e.g., non-fluid). Indeed, the nut spread's spreadability or fluidity is highly sensitive to the oil content of the nut spread; the lower the oil content, the harder the product is to spread. The addition of non-nut solids such as fiber further reduces the fluidity of the nut spread by creating a tri-modal particle size distribution for the finished nut spread (reduced fat nut spreads desirably have a mono-modal or bi-modal particle size distribution).

The texture of the nut spread is also adversely affected when the level of solids in the nut spread relative to the level of oil is increased. The texture of the nut spread is perceived as stickier since more effort is required to thin the peanut mass during mastication. Also, the larger particle size of the fiber particles creates an undesirable sensation of grittiness upon mastication of the nut spread. Furthermore, increasing the level of solids in a nut spread can adversely affect the flavor of the nut spread by diluting the peanut flavor.

Past attempts to provide nut spreads having desirable fluidity, smooth texture, and desirable flavor that comprise a high level of solids (e.g., greater than about 58%) have not been wholly successful. Efforts to reduce grittiness have resulted in high viscosity spreads. Moreover, attempts to reduce viscosity have resulted in nut spreads with less flavor compared to full fat peanut butters. Generally, the processes used to reduce viscosity are energy intensive; this can have a negative effect on flavor. A low temperature process taught by Wong et al. utilizes a roll milling operation to prepare defatted peanut solids for use in a low fat peanut spread. See U.S. Pat. No. 5,079,027, issued Jan. 7, 1992. Another process, taught by Walling et al., utilizes extrusion roasting or a combination of roll milling and high shear mixing to prepare defatted peanut solids that are combined with undefatted peanuts in the preparation of a low fat peanut spread. See U.S. Pat. No. 5,230,919, issued Jul. 27, 1993.

Attempts to reduce the fat and/or the caloric content of nut spreads have also been made where a major portion of the nut oil is replaced with a low calorie, low fat, or no calorie and no fat oil such as Salatrim®, Caprenin®, or olestra. In these spreads, the level of nut solids is substantially lower than in their full fat counterparts. As a result, these products have less flavor. In U.S. Pat. No. 6,010,737, issued Jan. 4, 2000, Meade teaches a nut spread having a maximum level of peanut solids of 34%. This amount is equivalent to that typically found in reduced fat peanut butter. For comparison, full fat peanut butter typically has about 45% peanut solids. As taught by Meade, a loss of spreadability and high in-line process viscosity occur when the nut solids level exceeds 29%.

The degree to which fat may be reduced in spreads taught by the art is limited because of the negative effect that fat reduction has on peanut flavor and texture. For example, the lowest fat content taught by Meade is 20%. Replacement of the nut oil with a low calorie or no fat oil such as olestra has been limited. This is because the simple replacement of the nut oil with olestra results in nut spreads that are low in flavor and have an undesirable texture characterized by a waxy mouthfeel, high viscosity, and increased stickiness perception. These negative effects are related to olestra's high viscosity, relative to nut oil, at ambient temperature.

Accordingly, it would be desirable to provide a low fat nut spread that is high in protein and fiber, yet has the flavor and texture of a full fat nut butter or spread.

SUMMARY OF THE INVENTION

The present invention provides a low fat nut spread that is high in protein and fiber, yet has the flavor and texture of a full fat nut butter or spread. The nut spread has a protein to fat ratio of greater than about 0.68:1, preferably greater than about 1:1, and most preferably greater than about 2:1. The protein content of the nut spread is greater than about 15%, preferably from about 18% to about 35%. Preferably, at least about 75% of the protein is from the nut solids. The fiber to fat ratio of the nut spread is greater than about 0.18:1, preferably greater than about 0.5:1, more preferably greater than about 1:1, and most preferably greater than about 1.5:1. The nut spread comprises from about 5% to about 20% fiber. The nut spread comprises less than about 20% fat, yet has the desirable fluidity, texture, and flavor of full fat spreads.

Preferably, the nut spread comprises more than about 60%, more preferably more than about 65%, solids. The remainder of the nut spread comprises nut oil and oil substitute. In a preferred embodiment, the solids to total oil content ratio of the nut spread is about 72/28. The particle size distribution of the nut spread is mono-modal, with a $D_{50}$ of less than 15 microns, preferably less than 10 microns, and a $D_{90}$ of less than 35 microns, preferably less than 25 microns.

Furthermore, the nut spread has at least about ⅓ fewer calories, preferably about ½ fewer calories, than full fat peanut butter. The nut spread has about 400 calories or less, preferably from about 250 calories to about 400 calories, per 2 tablespoon (32 gram) serving. The nut spread can be used as a filling in nutritious snack products.

The present invention also relates to a process for making the nut spread. The process comprises the steps of:

(a) preparing a protein containing oil suspension;

(b) preparing a sugar containing oil suspension; and (c) combining the protein containing oil suspension and the sugar containing oil suspension to form the nut spread.

The "protein containing oil suspension" comprises high amounts of protein and fiber. The "sugar containing oil suspension" comprises high amounts of sugar. Combining the nut spread ingredients via the formation and mixing of these two separate suspensions reduces mixing complexity and intensity, thus minimizing nut spread flavor loss.

DETAILED DESCRIPTION OF THE INVENTION

A. Definitions

While this invention will be generally described in terms of peanuts, it should be readily apparent that other suitable materials such as almonds, pecans, walnuts, cashews, filberts, macadamia nuts, Brazilians, sunflower seeds, sesame seeds, pumpkin seeds and soybeans can be utilized. The term "nut" as used herein encompasses these nuts and oil seeds. Mixtures of these nuts and oil seeds are also included by the term "nut."

As used herein, "nut paste" means a suspension of nut solids and oil resulting from the milling of nuts, wherein such milling ruptures the nut oil cells.

As used herein, the term "nut spread" means a spreadable food product comprising nut solids and fat/oil, plus other suitable ingredients such as nut butter stabilizers, flavorants, flavor enhancers, bulking agents, and emulsifiers. Nut spreads include, but are not limited to, "nut butters" and "peanut butters" as these terms are defined by the standards of identity of the U.S. Food and Drug Administration.

As used herein, "fiber" refers to total dietary fiber, as measured in accordance with the Analytical Methods section herein, unless otherwise indicated.

As used herein, the term "fat" refers to fat and oil. The amount of "fat" is measured in accordance with the Analytical Methods section herein. While the terms "fat" and "oil" are used somewhat interchangeably, the term "fat" usually refers to triglycerides that are solid or plastic at ambient temperature, while the term "oil" usually refers to triglycerides that are liquid or fluid at ambient temperature. Unless otherwise indicated, the term "fat" refers to both fat and oil herein.

The term "non-digestible" fat or oil refers to those edible fatty materials that are partially or totally indigestible, e.g., polyol fatty acid polyesters, such as olestra.

As used herein, the term "oil substitute" means a low calorie, low fat, non-digestible fat, non-digestible oil, or zero calorie oil such as, but not limited to, sucrose polyesters of long chain fatty acids (olestra) and other polyol polyesters of fatty acids. The preferred olestra is the Olean™ brand (available from the Procter & Gamble Company, Cincinnati, Ohio). See, for example, U.S. Pat. No. 3,600,186 to Mattson et al.; U.S. Pat. No. 5,422,131 to Elsen et al.; U.S. Pat. No. 5,419,925 to Seiden et al.; U.S. Pat. No. 5,071,669 to Seiden; and U.S. Pat. No. 4,005,196 to Jandacek. Mixed triglycerides made from medium and long chain saturated and/or unsaturated fatty acids may also be utilized. See, for example, U.S. Pat. No. 5,288,512 to Seiden. Oils that contain medium chain triglycerides can also be used. See, e.g., U.S. Pat. No. 4,863,753 to Hunter et al. Other oils which may be used include a triacylglycerol oil such as liquid Salatrim™ oil (sold under the trade name Benefat™ III by Cultor Food Science, New York, N.Y.). The term "oil substitute" also includes any other suitable liquid non-digestible oils. Liquid non-digestible oils which have a complete melting point below about 37° C. include liquid polyol fatty acid polyesters (see Jandacek; U.S. Pat. No. 4,005,195; issued Jan. 25, 1977); liquid esters of tricarballylic acids (see Hamm; U.S. Pat. No. 4,508,746; issued Apr. 2, 1985); liquid diesters of dicarboxylic acids such as derivatives of malonic and succinic acid (see Fulcher; U.S. Pat. No. 4,582,927; issued Apr. 15, 1986); liquid triglycerides of alpha-branched chain carboxylic acids (see Whyte; U.S. Pat. No. 3,579,548; issued May 18, 1971); liquid ethers and ether esters containing the neopentyl moiety (see Minich; U.S. Pat. No. 2,962,419; issued Nov. 29, 1960); liquid fatty polyethers of polyglycerol (See Hunter et al; U.S. Pat. No. 3,932,532; issued Jan. 13, 1976); liquid alkyl glycoside fatty acid polyesters (see Meyer et al; U.S. Pat. No. 4,840,815; issued Jun. 20, 1989); liquid polyesters of two ether linked hydroxypolycarboxylic acids (e.g., citric or isocitric acid) (see Huhn et al; U.S. Pat. No. 4,888,195; issued Dec. 19, 1988); various liquid esterified alkoxylated polyols including liquid esters of epoxide-extended polyols such as liquid esterified propoxylated glycerins (see White et al; U.S. Pat. No. 4,861,613; issued Aug. 29, 1989; Cooper et al; U.S. Pat. No. 5,399,729; issued Mar. 21, 1995; Mazurek; U.S. Pat. No. 5,589,217; issued Dec. 31, 1996; and Mazurek; U.S. Pat. No. 5,597,605; issued Jan. 28, 1997); liquid esterified ethoxylated sugar and sugar alcohol esters (see Ennis et al; U.S. Pat. No. 5,077,073); liquid esterified ethoxylated alkyl glycosides (see Ennis et al; U.S. Pat. No. 5,059,443, issued Oct. 22, 1991); liquid esterified alkoxylated polysaccharides (see Cooper; U.S. Pat. No. 5,273,772; issued Dec. 28, 1993); liquid linked esterified alkoxylated polyols (see Ferenz; U.S. Pat. No. 5,427,815; issued Jun. 27, 1995 and Ferenz et al; U.S. Pat. No. 5,374,446; issued Dec. 20, 1994); liquid esterified polyoxyalkylene block copolymers (see Cooper; U.S. Pat. No. 5,308,634; issued May 3, 1994); liquid esterified polyethers containing ring-opened oxolane units (see Cooper; U.S. Pat. No. 5,389,392; issued Feb. 14, 1995); liquid alkoxylated polyglycerol polyesters (see Harris; U.S. Pat. No. 5,399,371; issued Mar. 21, 1995); liquid partially esterified polysaccharides (see White; U.S. Pat. No. 4,959,466; issued Sep. 25, 1990); as well as liquid polydimethyl siloxanes (e.g., Fluid Silicones available from Dow Corning. Solid non-digestible fats or other solid materials can be added to the liquid non-digestible oils to prevent passive oil loss. Particularly preferred non-digestible fat compositions include those described in U.S. Pat. No. 5,490,995 issued to Corrigan, 1996, U.S. Pat. No. 5,480,667 issued to Corrigan et al, 1996, U.S. Pat. No. 5,451,416 issued to Johnston et al, 1995 and U.S. Pat. No. 5,422,131 issued to Elsen et al, 1995. U.S. Pat. No. 5,419,925 issued to Seiden et al, 1995 describes mixtures of reduced calorie triglycerides and polyol polyesters that can be used herein but provides more digestible fat than is typically preferred. Any other suitable non-digestible oils, reduced calorie oils, oil substitutes, or mixtures thereof are also included in the term "oil substitute." Mixtures of any of these oils, and mixtures of these oils with glyceride oils, are also included by the term.

As used herein, "total oil content" means oil plus oil substitute.

As used herein, the term "defatted" means that a portion of oil or fat has been removed.

As used herein, "nut flour" is a flowable solid that is obtained after mechanically defatting nut paste into a cake, followed by milling the cake into a granular powder.

As used herein, "nut solids" means fat-free nut solids (nut solids on a non-fat basis).

As used herein, "solids" means fat-free solids (solids on a non-fat basis).

As used herein "mono-modal" refers to a particle size distribution of solids having essentially a single peak. A "peak" is a local maxima which is at least 2 weight percent units greater than the local minima on either side of the local maxima. As used herein, "bi-modal" and "tri-modal" refer to particle size distribution curves having two and three peaks, respectively.

As used herein, "$D_{90}$" is the diameter of the ninetieth (90th) percentile particles, i.e. 90% of the particles in a sample have a smaller particle size than the size indicated. "$D_{50}$" is defined in a similar manner and represents the fiftieth (50th) percentile particles.

As used herein, all percentages (%) are by weight, unless otherwise indicated.

B. Ingredients

1. Defatted Nut Flour

Any suitable defatted nut flour can be used in the practice of the present invention. A preferred defatted nut flour utilizes a nut paste, preferably peanut paste, as a starting material. The nut paste can be formed by any of a number of known methods. For example, the nuts can be roasted and then ground in a conventional grinder or mill such as a Bauer mill to produce a continuous nut paste of pumpable consistency. The nut paste is then defatted by conventional methods such as by mechanical expression or the like. A cocoa powder press is a suitable device for defatting the nut paste. The pressed nut paste exits as a cake and is de-lumped to make a flowable powder. The nut flour can be milled such that the nut solids have a mono-modal particle size distribution. See, for example U.S. Pat. No. 5,097,027 issued Jan. 7, 1992 to Wong et. al. The fat content of the defatted nut flour is preferably from about 10% to about 30%, preferably from about 10% to about 25%, and more preferably from about 15% to about 22%.

2. Fiber

The nut spread comprises from about 5% to about 20% fiber. To obtain a nut spread with this level of fiber, any suitable source of fiber, including water soluble and water insoluble fiber, can be added. For example, fiber sources such as inulin (such as Raftiline™, available from Rhone Poulenc, Food Ingredients Division, Washington, Pa.; or Frutafit™, available from Imperial Suiker Unie, Sugarland, Tex.) and Fibersol™ (available from Matsutani Chemical Industry Co., Itami city, Hyogo, Japan) can be used. Other fiber that can be used include low calorie bulking agents such as polydextrose (such as Litesse™, available from Cultor Food Science) and microcrystalline cellulose (such as Avicel™ or Indulge™, available from FMC Corp., Food Ingredients Division, Philadelphia, Pa.). Mixtures of fiber sources can also be used.

3. Oil Substitute

To achieve the low fat content of the nut spread, a portion of the nut oil is replaced by an oil substitute. Preferably, at least about 25%, more preferably at least about 40%, and still more preferably at least about 50% of the nut oil is replaced by oil substitute. The nut spread comprises from about 5% to about 30% oil substitute. The preferred oil substitute is olestra.

4. Other Ingredients

The nut spread of the present invention may also optionally comprise a stabilizer. The stabilizer can be any of the known peanut butter stabilizers such as, but not limited to, hydrogenated rapeseed oil or other hydrogenated triglycerides having a high proportion of $C_{20}$ and $C_{22}$ fatty acids. (See, for example, U.S. Pat. No. 3,597,230 and U.S. Pat. No. 3,192,102.) Stabilizers are usually triglycerides which are solid at room temperature. They solidify in the nut butter in specific crystalline states and keep the oil from separating. These materials can be mixed with a second hydrogenated oil having an iodine value of less than 8, for example hydrogenated palm oil, canola oil, soybean oil, cottonseed oil, coconut oil, and similar materials. This stabilizer can also be mixed with lower melting fat fractions such as, for example, the peanut butter stabilizer composition disclosed in U.S. Pat. No. 4,341,814.

In addition to the stabilizer, or in lieu thereof, an emulsifier can be used in the present invention. The emulsifier can be any food compatible emulsifier such as mono- and di-glycerides, lecithin, sucrose monoesters, polyglycerol esters ("PGE"), sorbitan esters, polyethoxylated glycerols, and mixtures thereof. From about 0% to about 3%, preferably from about 1% to about 3%, stabilizer or emulsifier is preferably used.

The nut spread described herein can also comprise flavorants. "Flavorants," as the term is used herein, are agents which contribute to or enhance the flavor of the nut spread. These include sweeteners, flavor enhancers, artificial sweeteners, natural and artificial flavors, nut chunks and other additives which contribute to the flavor of the spread. Sweeteners are selected from the group consisting of sugars, sugar mixtures, artificial sweeteners, other naturally sweet materials and mixtures thereof. Sugars include, for example, sucrose, fructose, dextrose, honey, molasses, high fructose corn syrup, lactose, maltose, and maltose syrups. Preferably, the sweetener is a material having a sweetness intensity similar to that of sucrose or fructose. Artificial sweeteners such as aspartame, acesulfam, saccharine, cyclamate, and glycyrrhizin can also be used. The amount of sweetener used should be that amount effective to produce the desired sweetness. Other flavorants include natural or artificial peanut flavors, roasted flavors, and praline/caramel flavors, walnut flavors, almond flavors, and flavor compositions.

Flavor enhancers including salt, or salt substitutes such as potassium chloride, sodium chloride/potassium chloride mixtures, and seasoned salts can also be used. The level of flavor enhancer used is a matter of the desired taste level, but usually is from about 0.1% to about 2%.

The present invention can also employ nut chunks and other flavored additives which can be mixed with the peanut spread. These additives include chocolate chips or bits or other flavored bits (e.g., butterscotch and peanuts), jellies (either low calorie jellies or regular jellies or preserves), and praline nuts or other candies. When used, these additives are typically added at a level of from about 1% to about 20% by weight. Nut chunks and flavored bits can contain fats and oils. Thus, the addition of these materials can affect the fat content and the calorie level of the nut spread.

The nut spread can also be fortified with vitamins and/or minerals. These can include, but are not limited to, Vitamin C, Vitamin E, thiamin, riboflavin, niacin, Vitamin B-6, Vitamin B-12, biotin, pantothenic acid, iron, calcium, niacin, magnesium, and mixtures thereof.

Sterols or sterol esters can also be incorporated into the nut spread of the present invention. Preferably, if sterols or sterol esters are added, the nut spread comprises about 1.8 grams of sterol or sterol ester per serving. Suitable sterol and sterol ester compositions are described in U.S. Pat. No. 3,751,569, issued Aug. 7, 1973 to Erickson; U.S. Pat. No. 5,244,887, issued Sep. 14, 1993 to Straub; U.S. Pat. No. 3,865,939 issued Feb. 11, 1975 to Jandacek et al.; U.S. Pat. No. 3,085,939, issued Apr. 16, 1963 to Wruble; U.S. Pat. No. 5,502,045, issued Mar. 26, 1996 to Miettinen; U.S. Pat. No. 5,958,913, issued Sep. 28, 1999 to Miettinen; and in U.S. Provisional Application Ser. No. 60/192,412, filed Mar. 27, 2000 by Schul et al.

C. Process for Making the Nut Spread

The present invention also relates to a preferred process for making the nut spread. The process comprises the steps of:

(a) preparing a protein containing oil suspension;

(d) preparing a sugar containing oil suspension; and (e) combining the protein containing oil suspension and the sugar containing oil suspension to form the nut spread.

The "protein containing oil suspension" comprises high amounts of protein and fiber. The "sugar containing oil suspension" comprises high amounts of sugar. Combining the nut spread ingredients via the formation and mixing of these two separate suspensions reduces mixing complexity and intensity, thus minimizing nut spread flavor loss.

Although the present invention is described herein primarily in terms of a nut spread prepared with olestra, it should be readily apparent to one skilled in the art that any suitable oil substitute can be used.

1. Preparing a Protein Containing Oil Suspension

Defatted nut flour is combined with fiber. The addition of fiber can decrease the nut spread fluidity and creaminess and can cause the nut spread to taste gritty. Because water insoluble fiber is generally more susceptible to producing a gritty taste, water soluble fiber is preferably used.

The protein content of the nut spread is greater than about 15%, preferably from about 18% to about 35%. Protein from non-nut sources can be added to the nut flour/fiber mix to increase the protein content of the nut spread accordingly. To diminish loss of nut flavor due to dilution, it is preferable that a very high protein source is used. These high protein sources include, but are not limited to, soy flour, soy concentrate, soy isolate, casein, egg whites, protein from other animal or vegetable sources, and mixtures thereof. For example, a combination of soy protein isolate and egg white solids can be added.

For the desired nut flavor and protein content, the nut solids typically comprise from about 30% to about 60% of the nut spread, preferably from about 35% to about 55%, and more preferably from about 40% to about 50%. Although not as preferred, the source of the nut solids can also include full fat peanut paste, full fat peanuts, defatted peanuts, and mixtures thereof in the nut flour/fiber mix.

Other solid ingredients which can be used to prepare the fluid, non-gritty nut spreads of this invention can include, for example, diluents such as corn syrup solids, maltodextrin, dextrose, polydextrose, mono- and disaccharides, starches (e.g., corn, potato, wheat) and flours (e.g., wheat, rye and pea).

To reduce grittiness, the nut flour/fiber mix (which can comprise other desired suitable ingredients) is processed through a size reduction mill to form a milled mix. Before milling, olestra is added to the nut flour/fiber mix to raise the total oil content (oil plus oil substitute) to a sufficient level such that the mix can be processed through a size reduction mill. The total oil content is typically raised to about 20%. A sufficient amount of fluid must be in the solids to provide lubrication as the product passes through the size reduction mill. Suitable size reduction mills include those roll refining mills typically used in the chocolate making industry. These mills operate with rolls running at different speeds and at a closed gap (i.e., they are touching each other). A typical milled mix comprises about 70% defatted nut flour having about 17% fat, about 13% fiber, about 5% soy protein isolate, and about 8% olestra.

Processing the nut flour/fiber mix through a size reduction mill to form a milled mix results in a breakdown of the solids to the desired particle size. After milling, the particle size distribution ("PSD") of the milled mix is mono-modal, with a $D_{50}$ of less than 15 microns, preferably less than 10 microns, and a $D_{90}$ of less than 35 microns, preferably less than 25 microns. In a preferred embodiment, the mean particle size of the milled mix is about 8 microns. Milling the particles to this level of fineness reduces grittiness. Additionally, the reducing the solids to a mono-modal PSD enables the nut spread to achieve a significantly lower viscosity. As a result, the resultant nut spread is fluid and has a desirable texture and flavor. In addition to reducing the particle size, the milling step also coats all of the solids with a film of oil. The size reduction mill efficiently wets the solids (desorbs air from the solid surface and coats the solids with a film of oil). This wetting of the solids facilitates refatting later in the process, thus resulting in a less energy intensive process and less loss of the nut flavor.

Milling thus enables the production of a low fat nut spread having a high fiber and high protein content without sacrificing flavor and texture. The benefit of a mono-modal solids PSD for reducing nut spread viscosity is reported in U.S. Pat. Nos. 5,709,209; 5,433,970; and 5,693,357. Milling the solids to a mono-modal PSD allows for incorporation of a high level of nut solids without causing a huge loss of fluidity. As a result, nut spreads of this development can comprise more than about 30% nut solids. With the high percentage usage of nut solids, preferably more than about 75% of the protein is from the nut solids. The resultant benefits are more nut flavor and reduced ingredient costs.

Olestra is typically more viscous than the nut oil that it replaces. For instance, at ambient temperature, the apparent viscosity of olestra measured at 6.8 sec$^{-1}$ is typically about 4350 cP (centipoise) versus about 50 cP for peanut oil. Thus, replacement of the nut oil with olestra, particularly where the ratio of nut solids to total oil content (oil plus oil substitute) is greater than 1, typically results in a very viscous nut spread with poor spreadability, poor flavor display, a sticky texture, and a waxy mouthfeel. Surprisingly, milling to form a milled mix having a mono-modal PSD results in an enhancement of peanut flavor perception and is one of the key factors that contributes toward the elimination of the waxy mouthfeel that is commonly found when olestra is used.

The milled mix is then processed into a fluid paste by combining the milled mix with olestra. A typical composition comprises about 85% of the milled mix and about 15% olestra. Preferably, the ingredients are placed in a Werner Lehara, Peerless double arm mixer; the mixing vessel is jacketed and heated to 150° F. (66° C.) and the mixing speed is set at medium. About 10 minutes of mixing is required to convert the mix to an oil continuous paste to form the protein containing oil suspension.

2. Preparing a Sugar Containing Oil Suspension

The second oil suspension is a sugar containing oil suspension comprising a sugar-olestra mix and a surfactant. The mix can be prepared by mixing a surfactant with olestra in the same mixer used to make the protein containing oil suspension. Typical surfactant includes lecithin and PGE. Preferably, the mixing temperature is set at 150° F. (66° C.). Sugar is then added to the mix. The nut spread comprises from about 5% to about 20% sugar, preferably sucrose. Within 10 minutes a fluid sugar-olestra slurry is formed. The composition of this slurry is typically about 67% 12X sucrose, about 5% salt, about 2% olestra, and about 1% lecithin or PGE. The surfactant is used to reduce the solid-liquid interface, thus reducing the energy required to disperse the solids with the olestra mix. Adding the surfactant to this mix composition allows it to be effectively adsorbed onto the sugar and salt particle surfaces.

Because of the high viscosity of the olestra and the fine particle size of the sugar, the suspension is stable to oil separation. Stable suspensions for 3 months or more can be observed.

3. Combining the Protein Containing Oil Suspension and the Sugar Containing Oil Suspension to Form the Nut Spread The protein containing oil suspension and sugar containing oil suspension are combined by simply blending the two together in a mixing vessel. Preferably a crystalline fat stabilizer is also blended with the two suspensions. If the ingredients were initially combined into one mixture, rather than combined though the blending of two separate suspensions, a significant amount of mixing energy would be required to add, mix, and disperse the solids with the oil mix comprising olestra. Moreover, the addition of a surfactant would be less effective since it could not be effectively adsorbed onto the sugar and salt particles. Rather, the surfactant would likely be adsorbed by the protein particles. (Surfactants have little beneficial effect in lowering the viscosity of protein suspensions.)

D. Characteristics of the Nut Spread

The nut spread has a protein to fat ratio of greater than about 0.68:1, preferably greater than about 1:1, and most preferably greater than about 2:1. The protein content of the nut spread is greater than about 15%, preferably from about 18% to about 35%. Preferably, at least about 75% of the protein is from the nut solids. The fiber to fat ratio of the nut spread is greater than about 0.18:1, preferably greater than about 0.5:1, more preferably greater than about 1:1, and most preferably greater than about 1.5:1. The nut spread comprises from about 5% to about 20% fiber. The nut spread comprises less than about 20% fat, yet has the desirable fluidity, texture, and flavor of full fat spreads.

Preferably, the nut spread comprises more than about 60%, more preferably more than about 65%, solids. The remainder of the nut spread comprises nut oil and oil substitute. In a preferred embodiment, the solids to total oil content ratio of the nut spread is about 72/28. The particle size distribution of the nut spread is mono-modal, with a $D_{50}$ of less than 15 microns, preferably less than 10 microns, and a $D_{90}$ of less than 35 microns, preferably less than 25 microns.

Furthermore, the nut spread has at least about ⅓ fewer calories, preferably about ½ fewer calories, than full fat peanut butter. The nut spread has about 400 calories or less, preferably from about 250 calories to about 400 calories, per 2 tablespoon (32 gram) serving. The nut spread can be used as a filling in nutritious snack products.

ANALYTICAL METHODS

A number of parameters used to characterize elements of the present invention are quantified by particular experimental analytical procedures as follows:

1. Particle Size Analysis

A Malvern 2600D particle size analyzer with a PS/2 computer is used to analyze the particle size of the samples. A small amount (about 0.01 grams) of sample is placed in a 25 ml test tube and about 15 ml of acetone are added. The sample is dispersed in the acetone by using a vortex mixer. A transfer pipette is then used to add this diluted solution dropwise to the acetone filled cell of the analyzer. The sample is added until the obscuration is 0.2 to 0.3. The obscuration refers to the amount of light that is obscured by the sample because of diffraction and absorption. The instrument reads more accurately when the obscuration is 0.05 to 0.5 and preferably from 0.2 to 0.3 (20% to 30% of the light energy is reduced).

The apparatus is fitted with a 100 mm lens to determine the particle size. Particle sizes from 0.5 to 188 microns can be measured using a 100 mm lens. A magnetic stirrer is used to insure that the sample is dispersed during the readings. Each sample is swept 250 times by the laser for each reading. Each sample is read a minimum of three times with a five (5) minute wait between each reading.

2. Protein

The protein content of the nut spread is calculated after measuring the percent nitrogen content of the nut spread by the Kjeldahl digestion method. The Kjeldahl digestion method used is AOAC Official Method 979.09, "Protein in Grains" (32.2.03; Ch. 32, p. 23D). Percent protein is calculated by multiplying the % nitrogen by a conversion factor of 6.25:

$$\% \text{ protein} = \%N \times 6.25$$

3. Fiber a) Dietary Fiber Other Than Fructans:

The dietary fiber content is measured by the enzymatic-gravimetric according to AOAC Official Method 985.29, "Total Dietary Fiber in Foods" (45.4.07, Ch. 45, p. 70D-71), AOAC International, Gaithersburg, Md.

b) Fructans:

Fructans (e.g., inulin, oligofructose or fructooligosaccharide) are water-soluble oligosaccharides and polysaccharides that are not metabolized in the human upper gastrointestinal tract, but are fermented in the large bowel. Fructans are not measured by the classic AOAC method for dietary fiber (Method 985.29). Instead, they are measured by AOAC Official Method 997.08, "Fructans in Food Products" (45.4.06A, Ch. 45, p. 70–70D).

c) Total Dietary Fiber:

Total dietary fiber is calculated as follows:

$$\text{Total Dietary Fiber} = \text{Dietary Fiber Other Than Fructans} + \text{Fructans}$$

4. Fat

Fat content is measured according to AOAC Method PVM 4:1995, "Capillary Gas Chromatographic Determination of Fat in Olestra Savory Snack Products."

5. Viscosity

A Brookfield Viscometer (HAT series), 5C4-13R chamber with a 8C4-27 spindle is used. This arrangement comprises a spindle "bob" of 0.465 inches (1.12 cm). The inner diameter of the sample cell is 0.750 inches (1.87 cm). The instrument is calibrated at 65° C. (149° F.) and all samples are measured at 65° C. (149° F.).

A sample of 14.0 grams of the nut spread or nut paste (unaerated) is placed in the sample cell. The sample cell is then inserted in the jacketed cell holder. To compensate for heat losses through the tubings, etc., the water temperature entering the jacketed cell holder should be a few degrees higher than the desired sample temperature of 65° C. (149°

F.). After the temperature of the sample has reached 65° C. (149° F.) the sample is pre-sheared for five minutes at 50 rpm. The speed is then changed to 100 rpm and a measurement taken after waiting a period of time for the dial reading to settle to a constant value. A total of five scale readings are recorded: for 100, 50, 20, 10 and 5 rpm. In general, the waiting time before reading the dial setting should be as set forth in Table 1.

TABLE 1

| RPM | Time Before Reading (Seconds) |
|---|---|
| 100 | 3 |
| 50 | 6 |
| 20 | 15 |
| 10 | 30 |
| 5 | 60 |

The rpm and dial reading are converted into shear stress and shear rate values by multiplying the rpm and dial reading by 0.34 and 17, respectively. A plot of the square root of shear stress vs. the square root of shear rate results in a straight line. Readings where the dial pointer goes off scale are ignored. A least squares linear regression is made over the data to calculate the slope and intercept.

This data is used to calculate two values. The first of these is the plastic viscosity which is equal to the slope of the line squared. The plastic viscosity is a measurement of the viscosity of the nut spread/nut paste at an infinite shear rate. It accurately predicts the resistance to flow in pumping, moving or mixing situations. The Casson plastic viscosity is measured in poise.

The second value is the yield value which is equal to the value of the x-intercept (abscissa) squared. The yield value is a measure of amount of force or shear that is necessary to get the nut spread/nut paste to start moving. The yield value is measured in dynes/cm$^2$. The relationship between the plastic viscosity and the yield value determine how a nut spread/nut paste will behave in additional processing.

The apparent viscosity is the viscosity measured at 6.8 sec$^{-1}$ (Brookfield dial reading at 20 rpm). The apparent viscosity in cP is:

250×(the Brookfield Viscometer dial reading at 20 rpm)

Without being limited by theory, it is believed that the viscosity measured at 6.8 sec$^{-1}$ has the best correlation with sensory attributes.

6. Calories

The calorie content of the nut spread is determined according to U.S. Food and Drug Administration guidelines set forth in 21 C.F.R. §101.9, Ch. I (4-1-99 Edition).

EXAMPLES

The following examples are illustrative of the present invention but are not meant to be limiting thereof.

Example 1

Example 1 describes a reduced fat peanut spread made with olestra that is also high in fiber and protein. All of the protein is from the peanut solids. The nut spread has 36% fewer calories than conventional full fat peanut butter.

| Ingredients | Ingredient wt. % | Fat wt. % | Protein wt. % | Fiber wt. % |
|---|---|---|---|---|
| Defatted peanut flour @ 20% fat | 54.81 | 10.96 | 20.96 | 7.2 |
| Peanut oil | 7.99 | 7.99 | | |
| 12X Sucrose | 15.8 | | | |
| Salt | 1.09 | | | |
| Fiber (inulin) | 11 | | | 11 |
| Olestra | 9.11 | | | |
| PGE | 0.2 | 0.2 | | |
| Total | 100 | 19.15 | 20.96 | 18.2 |

A pre-mix for subsequent processing through a roll refining mill is made by blending 79.94% peanut flour with 16.04% fiber and 4.02% olestra. The pre-mix is passed through a 4 roll refining mill to reduce the particle size and to coat the solids with a film of oil/olestra. The particle size of the milled mix has a $D_{50}$ and $D_{90}$ of 7 and 16 microns, respectively.

To fluidize the milled mix, 87.5% of the milled mix is then combined with 12.5% of an oil mix that is composed of 84% peanut oil and 16% olestra. The mixing is performed in a jacketed Hobart bowl with the agitator set at medium. The temperature of the mixture is set at 150° F. (66° C.). The total mixing time is about 30 minutes. At the end of mixing, the product is a fluid paste. This is the protein containing oil suspension.

A sugar containing oil suspension is then prepared by mixing 72.98% sugar with 5.03% salt, 21.07% olestra, and 0.92% PGE, a surfactant. The addition of a surfactant is used to lower the solid/oil interfacial tension to allow for easier mixing. The mix is heated to 120° F. (49° C.) and mixed for about 30 minutes to achieve the desired fluidity state.

The protein and sugar containing oil suspensions are then combined in a 21.65 to 78.35 ratio, respectively. The two product streams are readily mixed. The nut spread composition comprises 19.2% fat, 18.2% fiber, and 21.0% protein. All of the protein is from the nut solids. The protein/fat ratio is 1.1:1 and the fiber/fat ratio is 0.95:1. The nut solids level on a non-fat basis (non-fat nut solids) is about 44%.

Example 2

Example 2 is a low fat, high protein and high fiber nut spread wherein 83% of the protein is from the nut solids. The nut spread has about 50% fewer calories than conventional full fat peanut butter.

| Ingredients | Ingredient wt. % | Fat wt. % | Protein wt. % | Fiber wt. % |
|---|---|---|---|---|
| Defatted peanut flour @ 16.5% fat | 49.80 | 8.19 | 19.89 | 6.83 |
| Soy Protein Isolate | 3.50 | | 3.15 | |
| Olestra | 22.2 | | | |
| 12X Sucrose | 13.80 | | | |
| Fiber (Fibersol) | 9.00 | | | 9 |
| Salt | 1.1 | | | |
| PGE | 0.2 | 0.2 | | |
| Stabilizer (hydrogenated soybean and rapeseed mix) | 0.4 | 0.4 | | |
| Total | 100 | 8.79 | 23.04 | 15.83 |

A pre-mix for subsequent processing through a roll refining mill is made by blending 73.63% peanut flour with 13.31% fiber, 5.17% soy protein isolate, and 7.89% olestra. The total oil content of the mix is 20%. The mix is passed through a 4 roll refining mill to reduce the particle size and to coat the solids with a film of oil/olestra. The particle size of the milled mix has a $D_{50}$ and $D_{90}$ of 7.6 and 22 microns, respectively.

To fluidize the milled mix, 85.6% milled mix is then combined with 14.4% olestra. The total oil content (olestra plus peanut oil) in the mixture is 31.5%. The mixing is performed in a jacketed double arm mixer manufactured by Werner Lehara. The mixing speed is set at medium and the mixture temperature is at 150° F. (66° C.). About 10 minutes of mix time is required to convert the mixture to a fluid paste. This is the protein containing oil suspension.

A sugar containing oil suspension is then prepared by mixing 66.96% 12X sugar with 5.34% salt, 0.97% PGE (surfactant), and 26.73% olestra. The same mixer used for mixing the nut solids is used. To facilitate mixing, all of the triglyceride oils and olestra may be mixed prior to the addition of the sugar and salt. The addition of a surfactant is used to lower the solid/oil interfacial tension to allow for easier mixing. The mix is heated to 150° F. (66° C.) and about 10 minutes of mixing is used to achieve the desired viscosity.

The protein and sugar containing oil suspensions are then combined and mixed with a fat stabilizer. The same mixer is used. The composition of this mix comprises 78.99% protein containing oil suspension, 20.61% sugar containing oil suspension, and 0.4% fat stabilizer. Blend uniformity is easily accomplished since all of the components are already fluid. The nut spread has 8.8% fat, 15.8% fiber, and 23.0% protein. About 86% of the protein is in the form of nut solids. The nut spread is more nutritious than full fat peanut butter and has protein/fat and fiber/fat ratios of 2.62:1 and 1.8:1, respectively.

INCORPORATION BY REFERENCE

All of the aforementioned patents, publications, and other references are herein incorporated by reference in their entirety. In addition, the following U.S. Patents are also herein incorporated by reference: U.S. Pat. No. 5,885,646, issued Mar. 23, 1999; U.S. Pat. No. 5,942,275, issued Aug. 24, 1999; U.S. Pat. No. 5,885,645, issued Mar. 23, 1999; U.S. Pat. No. 5,693,357, issued Dec. 2, 1997; U.S. Pat. No. 5,667,838, issued Sep. 16, 1997; U.S. Pat. No. 5,518,755, issued May 21, 1996; U.S. Pat. No. 5,508,057, issued Apr. 16, 1996; U.S. Pat. No. 5,164,217, issued Nov. 17, 1992; U.S. Pat. No. 5,079,027, issued Jan. 7, 1992; and U.S. Pat. No. 6,063,430, issued May 16, 2000, all to Wong et al.; U.S. Pat. No. 5,714,193, issued Feb. 3, 1998 to Fix et al.; U.S. Pat. No. 5,490,999, issued Feb. 13, 1996 to Villagran et al.; and U.S. Pat. No. 5,230,919, issued Jul. 27, 1993 to Walling et al.

What is claimed:

1. A nut spread comprising at least about 35% by weight on a non-fat basis of nut solids, wherein said nut spread has a protein to fat ratio of greater than about 0.68:1, a fiber to fat ratio of greater than about 0.18:1, and less then about 20% fat; and wherein said nut spread comprises a mixture of:

(a) a protein containing oil suspension comprising defatted nut flour, fiber, oil, oil substitute, and optionally diluents, and optionally non-nut protein;

(b) a sugar containing oil suspension comprising sugar, oil substitute, and surfactant.

2. The but spread of claim 1, having a protein to fat ratio of greater than about 1:1.

3. The nut spread of claim 2, baying a fiber to fat ratio of greater than about 0.5:1.

4. The nut spread of claim 1, comprising from about 5% to about 20% fiber.

5. The nut spread of claim 1, comprising greater than about 15% protein.

6. The nut spread of claim 5, comprising from about 18% to about 35% protein.

7. The nut spread of claim 1, having a mono-modal particle size distribution with a $D_{50}$ of loss than 15 microns and a $D_{90}$ of less than 35 microns.

* * * * *